United States Patent
Kubota et al.

[11] Patent Number: 5,862,293
[45] Date of Patent: Jan. 19, 1999

[54] TRACKING CONTROL FOR DIGITAL SIGNAL REPRODUCING AND AFTER-RECORDING APPARATUS AND METHOD

[75] Inventors: Yukio Kubota; Yoichirou Senshu, both of Kanagawa, Japan

[73] Assignee: Sony Corporation, Tokyo, Japan

[21] Appl. No.: 791,497

[22] Filed: Jan. 27, 1997

Related U.S. Application Data

[63] Continuation of Ser. No. 942,045, Sep. 8, 1992, abandoned.

[30] Foreign Application Priority Data

Jul. 17, 1991 [JP] Japan ................... 3-236271

[51] Int. Cl.$^6$ ................................................. H04N 5/93
[52] U.S. Cl. ........................... 386/56; 360/18; 360/77.15
[58] Field of Search ............... 360/77.06–77.08, 360/77.12–15, 19.1, 13, 18; 386/56

[56] References Cited

U.S. PATENT DOCUMENTS

| | | | |
|---|---|---|---|
| 4,899,233 | 2/1990 | Yoshida | 360/77.13 X |
| 5,121,259 | 6/1992 | Yamashita | 360/19.1 |

FOREIGN PATENT DOCUMENTS

| | | |
|---|---|---|
| 0 355 721 | 2/1990 | European Pat. Off. . |
| 0 391 728 | 10/1990 | European Pat. Off. . |
| 3809179 | 9/1988 | Germany . |
| 2 204 179 | 11/1988 | United Kingdom . |

*Primary Examiner*—Andrew L. Sniezek
*Attorney, Agent, or Firm*—Frommer Lawrence & Haug, LLP; William S. Frommer

[57] ABSTRACT

An apparatus and method for reproducing and after-recording digital signals in slant recording tracks sequentially arranged on a recording medium includes a recording subsystem for recording digital signals in each of the slant tracks and a reproducing subsystem for reproducing digital signals therefrom. The recording and reproducing subsystems include one or more recording and/or reproducing heads for scanning each of the tracks for recording and reproducing digital data therein. A tracking control subsystem controls tracking of the heads with respect to the tracks in a reproducing mode based upon tracking signals recorded both in first and second tracking signal recording areas of the tracks located at initial and final scan positions, respectively, of each track. In an after-recording mode, the tracking control subsystem utilizes tracking signals recorded in only one of the tracking signal recording areas while recording digital signals in a first sub information recording area proximal to the area from which the utilized tracking signals have been obtained.

10 Claims, 2 Drawing Sheets

TRACKING CONTROL FOR DIGITAL SIGNAL REPRODUCING AND AFTER-RECORDING APPARATUS AND METHOD

This application is a continuation of application Ser. No. 07/942,045, filed Sep. 8, 1992, now abandoned.

BACKGROUND OF THE INVENTION

The present invention relates to digital signal recording and reproducing apparatus which is particularly useful in commercial applications.

Known digital video tape recorders (digital VTR's) designed for commercial applications digitize and record video and audio signals, as main and sub information signals, respectively, in correspondingly different areas in slant tracks formed sequentially on a video tape. The known digital VTR is provided with an after-recording mode of operation in which only an audio signal and a sub code signal are again recorded.

FIG. 1 of the accompanying drawings illustrates the format of one of a plurality of slant tracks 20 formed on a video tape by the digital VTR. As shown in FIG. 1, the various signals are recorded sequentially in the track 20 by a recording head (not shown for purposes of simplicity and clarity) scanning the track beginning at an initial track scan position 22 and proceeding to a final track scan position 24 thereof. Accordingly, as the recording head scans the track 20, from the initial track scan position 22, a first automatic track following (ATF) signal recording area AT1 is formed in which a first ATF signal for use in tracking adjustment is recorded. In sequence thereafter, a first audio signal recording area AU1 is formed in the track 20 wherein a first audio signal is recorded (also referred to as a first sub information signal). Subsequently to the formation of the recording area AU1, a second audio signal recording area AU2 is formed in which a second audio signal is recorded (also referred to as a second sub information signal). Following the formation of the recording area AU2, a video signal recording area VI is formed in which the video signal is recorded (also referred to as a main information signal). Following the formation of the area VI, a sub code signal recording area SC is formed in which a sub code signal is recorded (also referred to as a third sub information signal). Finally, adjacent the final scan position 24, a second ATF signal recording area AT2 is formed in which a second ATF signal is recorded for tracking adjustment purposes.

It is often seen that the track angle and the angle at which the head scans the recording tracks do not coincide because of a lack of compatibility between the digital VTR and other apparatus. In that case, the automatic tracking control function is carried out with the use of the first and second ATF signals reproduced respectively from the ATF signal recording areas AT1 and AT2 of each of the tracks. In operation, the respective tracking error signals are detected from the reproduced ATF signals, and then automatic tracking control is carried out so that the tracking error signals are both minimized. Consequently, the automatic tracking function is carried out so that the scanning locus of the head (indicated by the dash line x in FIG. 1) coincides with the track 20 at the center of the tape.

If the above described automatic tracking-control technique is employed, then the video signal is reproduced satisfactorily. However, in the after-recording mode of the digital VTR in which only an audio signal and a sub code signal are recorded, for example, the track 20 and the head scanning locus do not coincide either in the audio signal recording area or in the sub code signal recording area. Consequently, it may be that after-recording cannot be carried out satisfactorily with the use of the above described automatic tracking control technique.

OBJECTS AND SUMMARY OF THE INVENTION

Accordingly, it is an object of the present invention to provide improved apparatus and methods for reproducing and after-recording digital signals which overcome the above described shortcomings and disadvantages of the prior art.

It is another object of the present invention to provide improved apparatus and methods for reproducing and after-recording digital signals in which satisfactory tracking control can be achieved in the after-recording mode of operation.

According to one aspect of the present invention, an apparatus for reproducing and after-recording digital signals in slant recording tracks sequentially arranged on a recording medium, each of the slant recording tracks having a main signal recording area, a first sub information recording area having one of a scan preceding and a scan following relationship with respect to the main signal recording area, and first and second tracking signal recording areas provided adjacent an initial scan position and a final scan position, respectively, of each of the slant recording tracks, each of the tracking signal recording areas recording tracking signals therein, comprises: recording means for recording digital signals in each of the slant recording tracks; reproducing means for reproducing digital signals in each of the slant recording tracks; the recording and reproducing means including scanning means for scanning each of the slant recording tracks for respectively recording and reproducing digital data therein; and tracking control means for controlling tracking of the scanning means with respect to one of the slant recording tracks in a reproducing mode of the apparatus based upon tracking signals recorded in both of the first and second tracking signal recording areas; the tracking control means being further operative in the after-recording mode of the apparatus in which digital signals are recorded in the first sub information recording area, to control tracking of the scanning means based upon tracking signals recorded in only one of the first and second tracking signal recording areas of a corresponding slant track.

In accordance with another aspect of the present invention, a method for reproducing and after-recording digital signals in slant recording tracks sequentially arranged on a recording medium, each of the slant recording tracks having a main signal recording area, a first sub information recording area having one of a scan preceding and a scan following relationship with respect to the main signal recording area, and first and second tracking signal recording areas provided adjacent an initial scan position and a final scan position, respectively, of each of the slant recording tracks, each of the tracking signal recording areas recording tracking signals therein, comprises the steps of: providing an apparatus for scanning the slant recording tracks to record and reproduce digital signals therein in selectable after-recording and reproducing modes of the apparatus, respectively; selecting one of the after-recording and reproducing modes of the apparatus; in the reproducing mode of the apparatus, scanning the slant recording tracks to reproduce digital signals therefrom while controlling tracking of the scanned tracks under the control of tracking signals recorded in both of the tracking signal recording areas in ones each of the tracks scanned in the reproducing mode; and in the after-recording mode of the apparatus, scanning the slant recording tracks to record digital signals in the first sub information recording area thereof while controlling tracking of the scanned tracks based on tracking signals recorded in only one of the tracking signal recording areas in ones each of the tracks scanned in the after-recording mode.

The apparatus and method of the present invention provide the ability to position the track and the head scanning locus with each other selectively at the first sub information recording area in the after-recording mode since tracking control is carried out using the tracking signals from only one of the tracking adjustment signal recording areas. In addition, in the reproducing mode the main information signal can be reproduced satisfactorily since tracking control is carried out with the use of the tracking signals from both of the tracking signal recording areas. Therefore, satisfactory tracking control can be achieved both in the reproducing and after-recording modes.

The above and other objects, features, and advantages of the present invention will be become apparent from the following detailed description of certain illustrative embodiments thereof which is to be read in conjunction with the accompanying drawings, in which like reference numerals are used to identify the same or similar parts in the several views of the drawings.

DETAILED DESCRIPTION OF CERTAIN PREFERRED EMBODIMENTS

Figure 2:
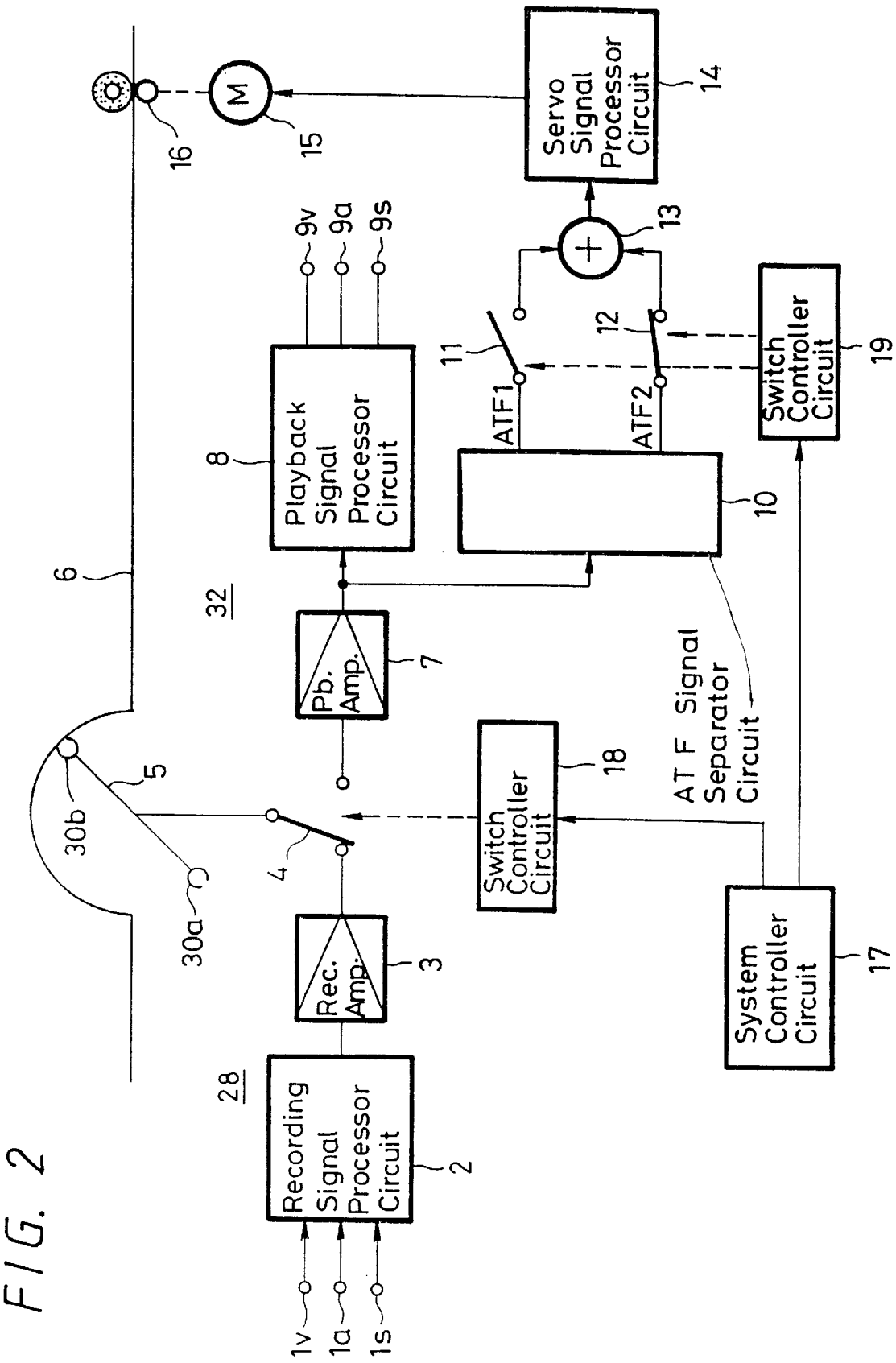
FIG. 2 is a block diagram of an embodiment of a digital video tape recorder in accordance with the present invention.

Referring now to FIG. 2 of the accompanying drawings, the principal circuit elements of a preferred embodiment of a digital video tape recording apparatus for reproducing and after-recording digital signals on a video tape are illustrated therein.

Figure 1:
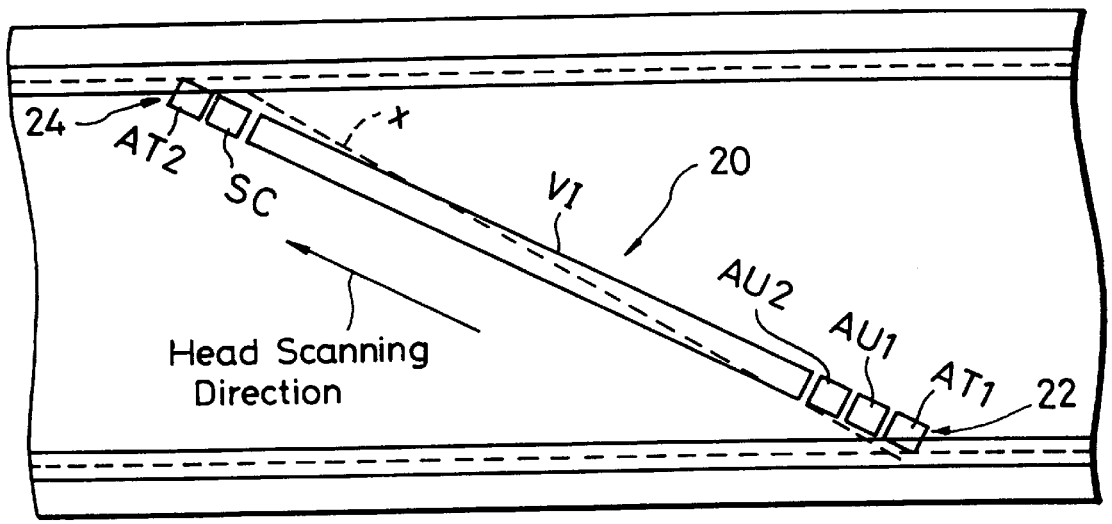
FIG. 1 is a diagrammatic view of a portion of a video tape recording medium illustrating the format of a slant track recorded by a prior art digital VTR.

As shown in FIG. 2, a recording section 28 of the digital video tape recorder includes input terminals 1v, 1a and 1s to which a video signal, an audio signal and a sub code signal are provided, respectively, for recording on a magnetic tape 6. A recording signal processor circuit 2 is coupled with each of the input terminals 1v, 1a and 1s to receive the video, audio and sub code signals and serves to combine the received signals sequentially with automatic track following (ATF) signals generated thereby to form a recording signal which it supplies at an output thereof. A recording amplifier 3 of the recording section 28 has an input coupled with the output of the circuit 2 to receive the recording signal and serves to amplify the same which the circuit 3 in turn supplies to an output thereof. The output of the recording amplifier 3 is coupled with a first fixed input terminal of a switching device 4. A movable terminal of the switching device 4 is coupled with a pair of rotary recording/reproducing heads 30a and 30b angularly spaced by 180 degrees on a rotary head assembly 5. The movable terminal of the device 4 is coupled as appropriate to the first fixed input terminal thereof to provide the amplified recording signal to the heads 30a and 30b. The heads 30a and 30b scan the magnetic tape 6 to record the amplified recording signal in slant recording tracks formed sequentially thereon having the format illustrated in FIG. 1. It will be appreciated that various other forms of rotary head assemblies may be used in place of the assembly 5. For example, different numbers of heads and head arrangements (such as one or more pairs of heads each in a unitary assembly) may be employed.

A reproducing section 32 of the digital video tape recorder of FIG. 2 includes a playback amplifier 7 having an input coupled with a second fixed terminal of the switching device 4. In a reproducing mode of the digital video tape recorder, signals recorded in the slant recording tracks formed on the magnetic tape 6 are reproduced by the heads 30a and 30b of the rotary head assembly 5 and supplied thereby to the movable terminal of the switch 4 which is then coupled with the second fixed terminal to provide the playback signals to the input of the playback amplifier 7. The playback amplifier 7 amplifies the signals received thereby and supplies the same to an output thereof coupled with an input of a playback signal processor circuit 8. The playback signal processor circuit 8 serves to recover a video signal, an audio signal and a sub code signal from the amplified playback signal which the circuit 8 then supplies to output terminals 9v, 9a and 9s, respectively, of the digital video tape recorder.

The amplified playback signals provided at the output of the playback amplifier 7 are also supplied to an ATF signal separating circuit 10 which separates respective ATF signals ATF1 and ATF2 reproduced from the recording areas AT1 and AT2 of each of the slant recording tracks formed on the magnetic tape 6. The signals ATF1 and ATF2 thus separated by the circuit 10 are supplied thereby through respective switching devices 11 and 12 to corresponding inputs of an adding circuit 13 which serves to additively combine the signals received at its inputs and supplies the combined signals at an output thereof. The output of the adding circuit 13 is coupled with an input of a servo signal processor circuit 14 which produces a servo control signal in response thereto. The magnetic tape 6 is driven by means of a capstan 16 and associated capstan motor 15 under the control of the servo control signal produced by the servo signal processor circuit 14.

A system controller circuit 17 serves to control the mode of operation of the digital video tape recorder. For this purpose the circuit 17 supplies a mode control signal to a first switch controller circuit 18 which responds thereto by supplying appropriate switching control signals to the switching device 4 thus to control the position of the movable terminal thereof as necessary for the selected reproducing or after-recording mode. In the reproducing mode, the switch controller circuit 18 causes the switching device 4 to couple its movable input terminal with the second fixed terminal thereof to provide the playback signals to the input of the playback amplifier 7. In the after-recording mode, the switch controller circuit 18 selectively couples the movable terminal of the switching device 4 with the first fixed terminal thereof as the heads 30a and 30b scan the areas of the slant tracks on the tape 6 to be after-recorded. Otherwise the circuit 18 causes the switching device 4 to couple its movable terminal with its second fixed terminal so that the ATF signals from the recording areas AT1 and AT2 of each of the slant recording tracks scanned by the heads 30a and 30b are supplied to the input of the playback amplifier 7 for tracking control purposes.

Figure 3:
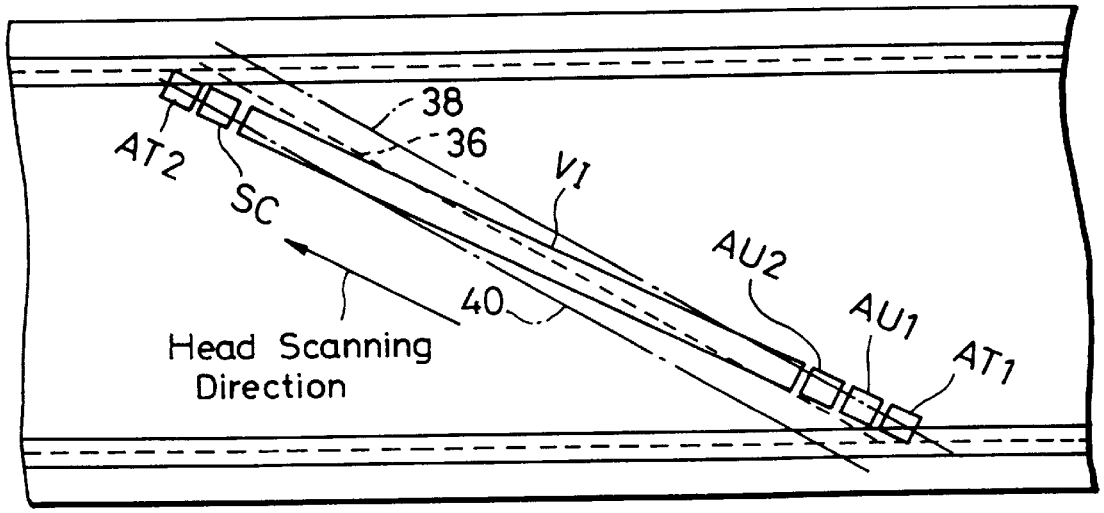
FIG. 3 is a diagrammatic view of a portion of a video tape recording medium for use in explaining the operation of the embodiment of FIG. 2.

The system controller circuit 17 also controls the states of the switching devices 11 and 12 according to the mode of operation by supplying a tracking mode control signal to a second switch controller circuit 19 coupled with control inputs of the switching devices 11 and 12. Accordingly, in a normal playback mode of the digital VTR, the switching devices 11 and 12 are both CLOSED under the control of the second switch controller circuit 19, so that the additively combined signals ATF1 and ATF2 from the recording areas AT1 and AT2, respectively, are supplied to the servo signal processor circuit 14. The circuit 14 responds by controlling the travel of the magnetic tape 6 so that the tracking error signals ATF1 and ATF2 are minimized. With reference also to FIG. 3, in the normal playback mode of the digital VTR the head scanning locus is illustrated diagrammatically by the dash line 36 in FIG. 3 so that the head scanning locus then coincides with the track at the center of the tape.

Where only an audio signal is to be recorded in the after-recording mode, the switching device 12 is maintained in an OPEN state while the switching device 11 is CLOSED under the control of the circuit 19. Accordingly, the tracking error signal is then produced by the servo signal processor circuit 14 based only on the signal ATF1 from the recording area AT1, and the servo signal processor circuit 14 consequently controls the travel of the magnetic tape 6 in order to minimize the tracking error signal so produced. As a result, the scanning locus of the head will coincide with the track in the recording area AT1, as illustrated by the one-dot chain line 38 of FIG. 3.

Where instead only a sub code signal is recorded in the after-recording mode, the switch controller circuit 19 then maintains the switching device 12 in the CLOSED state, while maintaining the state of the switching device 11 in the OPEN state. Consequently, only the signal ATF2 is supplied to the servo signal processor circuit 14 which responds by producing a servo control signal to minimize only the signal ATF2. The head scanning locus, therefore, will coincide with the track in the recording area AT2, as illustrated by the 1-dot chain line 40 of FIG. 3.

Accordingly, when the digital VTR of FIG. 2 carries out after-recording of a first audio signal in the recording area AU1 illustrated in FIG. 3 as a first sub information signal, as well as when the VTR records a second audio signal in the recording area AU2 in the after-recording mode as a second sub information signal, automatic tracking control is carried out using the signal ATF1 obtained from the ATF signal recording area AT1 which is positioned in proximity with the first and second audio signal recording areas AU1 and AU2. Consequently, the automatic tracking control function causes the head scanning locus to coincide with the track in the recording area AT1, so that the head scanning locus is proximal to the track in the vicinity of the audio signal recording areas AU1 and AU2. As a result, after-recording of the audio signals in the areas AU1 and AU2 may be carried out in a satisfactory manner.

Likewise, when the digital VTR of FIG. 2 carries out after-recording of the sub code signal in the recording area SC of FIG. 3 as a third sub information signal, automatic tracking control is carried out using the signal ATF2 reproduced from the area AT2 positioned in proximity with the sub code signal recording area SC. As a result, when after recording of the sub code signal is carried out the automatic tracking control function causes the head scanning locus to coincide with the track in the recording area AT2, so that the head scanning locus is proximal to the track in the vicinity of the sub code signal recording area SC, and after-recording of the sub code signal may thus be carried out in a satisfactory manner.

It will thus be seen that the present invention, which carries out a tracking control function with the use of signals recorded in only one tracking adjustment signal recording area which is near an area of the track in which information is to be recorded in an after-recording mode, provides the ability to bring the track and the head scanning locus near to one another as the head scans the sub information recording area. As a result after-recording of the sub information signal may be carried out in a satisfactory manner.

Although specific embodiments of the invention have been described in detail herein with reference to the accompanying drawings, it is to be understood that the invention is not limit to those precise embodiments, and that various changes and modifications may be effected therein by one skilled in the art without departing from the scope or spirit of the invention as defined in the appended claims.

What is claimed is:

1. An apparatus for reproducing and after-recording digital signals in slant recording tracks sequentially arranged on a recording medium, each of said slant recording tracks having a main signal recording area, a first sub information recording area having a scan preceding relationship with respect to said main signal recording area, a second sub information recording area having a scan following relationship with respect to said main signal recording area, a first tracking signal recording area adjacent an initial scan position and having a scan preceding relationship with respect to said main signal recording area, and a second tracking signal recording area adjacent a final scan position and having a scan following relationship with respect to said main signal recording area, each of said tracking signal recording areas recording tracking signals therein, comprising:

recording means for recording digital signals in said each of said slant recording tracks;

reproducing means for reproducing digital signals in said each of said slant recording tracks;

the recording and reproducing means including scanning means for scanning said each of said slant recording tracks for respectively recording and reproducing digital data therein; and tracking control means for controlling tracking of the scanning means with respect to one of said slant recording tracks in a reproducing mode of the apparatus based upon tracking signals recorded in both of the first and second tracking signal recording areas;

the tracking control means being further operative in a first after-recording mode of the apparatus to control tracking of the scanning means based solely upon tracking signals recorded in said first tracking signal recording area of said slant tracks when digital signals are recorded in the first sub information area, and being further operative in a second after-recording mode of the apparatus to control tracking of the scanning means based solely upon tracking signals recorded in said second tracking signal recording area of said slant tracks when digital signals are recorded in the second sub information area, wherein each time after-recording is executed a selection is made between said first after-recording mode and said second after-recording mode and said selection is independent of any prior selection of after-recording mode.

2. The apparatus of claim 1, wherein the recording means is operative in the after-recording modes to selectively record one of a digital audio signal in one of the first and second sub information recording areas and a digital sub code signal in the other of the first and second sub information recording areas.

3. The apparatus of claim 1, wherein the reproducing means is operative to reproduce digital video signals from the main signal recording area.

4. The apparatus of claim 3, wherein the recording means is operative to record a digital audio signal in the first sub information recording area.

5. The apparatus of claim 4, wherein the recording means is operative to record a sub code signal in said second sub information recording area of said each of said slant recording tracks.

6. A method for reproducing and after-recording digital signals in slant recording tracks sequentially arranged on a recording medium, each of said slant recording tracks having a main signal recording area, a first sub information recording area having a scan preceding relationship with respect to said main signal recording area, a second sub information recording area having a scan following relationship with respect to said main signal recording area, a first tracking signal recording area adjacent an initial scan position and having a scan preceding relationship with respect to said main signal recording area, and a second tracking signal recording area adjacent a final scan position and having a scan following relationship with respect to said main signal recording area, each of said tracking signal recording areas recording tracking signals therein, comprising the steps of:

provinding an apparatus for scanning said slant recording tracks to record and reproduce digital signals therein in selectable first after-recording, second after-recording, and reproducing modes of said apparatus, respectively;

selecting one of the after-recording and reproducing modes of said apparatus;

in the reproducing mode of said apparatus, scanning the slant recording tracks to reproduce digital signals therefrom while controlling tracking of the scanned tracks under the control of tracking signals recorded in both of the tracking signal recording areas in respective ones of each of the tracks scanned in said reproducing mode;

scanning the slant recording tracks in said first after-recording mode while controlling tracking of the scanned tracks based solely on tracking signals recorded in said first tracking signal recording area of said scanned tracks when recording digital signals in said first sub information recording area of said scanned tracks; and scanning the slant recording tracks in said second after-recording mode while controlling tracking of the scanned tracks based solely on tracking signals recorded in said second tracking signal recording area of said scanned tracks when recording digital signals in said second sub information area of said scanned tracks, wherein each time after-recording is executed a selection is made between said first after-recording mode and said second after-recording mode and said selection is independent of any prior selection of after-recording mode.

7. The method of claim 6, wherein one of a digital audio signal and digital subcode signal is recorded in said first sub information area according to said first after-recording mode, and the other of said digital audio signal and digital subcode signal is recorded in said second sub information area according to said second after-recording mode.

8. The method of claim 6, wherein the step of scanning the slant recording tracks to reproduce digital signals comprises scanning ones of the tracks to reproduce video signals recorded in the main signal recording areas thereof.

9. The method of claim 8, wherein the step of scanning the slant recording tracks in said first after-recording mode comprises recording a digital audio signal in the first sub information recording area of the tracks.

10. The method of claim 9, wherein the step of scanning the slant recording tracks in said second after-recording mode comprises scanning ones of the slant recording tracks to record a sub code signal in said second sub information recording area of each of said ones of said slant recording tracks.

\* \* \* \* \*